(12) United States Patent
Strano

(10) Patent No.: US 9,555,813 B2
(45) Date of Patent: Jan. 31, 2017

(54) METHOD AND SYSTEM FOR PREVENTING INSTABILITY IN A VEHICLE-TRAILER COMBINATION

(71) Applicant: JAGUAR LAND ROVER LIMITED, Warwickshire (GB)

(72) Inventor: Giovanni Strano, Coventry (GB)

(73) Assignee: Jaguar Land Rover Limited, Whitley, Coventry (GB)

( * ) Notice: Subject to any disclaimer, the term of this patent is extended or adjusted under 35 U.S.C. 154(b) by 0 days.

(21) Appl. No.: 14/426,190

(22) PCT Filed: Sep. 6, 2013

(86) PCT No.: PCT/EP2013/068465
§ 371 (c)(1),
(2) Date: Mar. 5, 2015

(87) PCT Pub. No.: WO2014/037500
PCT Pub. Date: Mar. 13, 2014

(65) Prior Publication Data
US 2015/0203128 A1 Jul. 23, 2015

(30) Foreign Application Priority Data
Sep. 6, 2012 (GB) .................................. 1215900.0

(51) Int. Cl.
*G08B 21/00* (2006.01)
*B60W 50/14* (2012.01)
(Continued)

(52) U.S. Cl.
CPC ................ *B60W 50/14* (2013.01); *B60D 1/30* (2013.01); *B60D 1/62* (2013.01); *B60R 1/003* (2013.01); *B60W 30/02* (2013.01)

(58) Field of Classification Search
CPC ... B60T 8/1755; B60T 2230/06; B60W 10/20; B60W 2520/14; B60W 40/114; B60W 50/14; B60W 30/02; B60R 1/003; B60D 1/30; B60D 1/62
(Continued)

(56) References Cited

U.S. PATENT DOCUMENTS

2005/0206235 A1  9/2005  Tseng
2009/0005932 A1  1/2009  Lee et al.
(Continued)

FOREIGN PATENT DOCUMENTS

EP  1593552 A1  11/2005
EP  2045155 A1  4/2009
(Continued)

OTHER PUBLICATIONS

Combined Search and Examination Report under Section 17 and 18(3) for Application No. GB1419825.3, dated May 8, 2015.
(Continued)

*Primary Examiner* — Thomas Mullen
(74) *Attorney, Agent, or Firm* — Carlson, Gaskey & Olds

(57) ABSTRACT

A method of preventing instability in a vehicle-trailer combination (10) is provided. The method comprises monitoring relative movement between the vehicle (20) and the trailer (30) using optical sensing means; determining a trailer yaw condition in dependence on a signal output from the optical sensing means; comparing the determined trailer yaw condition to a predetermined threshold yaw condition; and when the determined trailer yaw condition is equal to or greater than the predetermined threshold yaw condition, outputting an alert signal indicative of the onset of instability in the vehicle-trailer combination.

19 Claims, 4 Drawing Sheets

(51) Int. Cl.
- *B60D 1/30* (2006.01)
- *B60D 1/62* (2006.01)
- *B60R 1/00* (2006.01)
- *B60W 30/02* (2012.01)

(58) Field of Classification Search
USPC .............. 340/431, 440; 701/36, 41; 348/148
See application file for complete search history.

(56) References Cited

U.S. PATENT DOCUMENTS

| | | | |
|---|---|---|---|
| 2009/0093928 A1* | 4/2009 | Getman | ................ B60T 8/1755 |
| | | | 701/37 |
| 2009/0105906 A1* | 4/2009 | Hackney | ............... B60T 8/1708 |
| | | | 701/38 |
| 2009/0198425 A1 | 8/2009 | Englert | |
| 2010/0241319 A1* | 9/2010 | Choby | ...................... B60T 7/20 |
| | | | 701/48 |
| 2011/0087402 A1 | 4/2011 | Banks | |
| 2013/0158801 A1* | 6/2013 | Tober | .................. B60T 8/17551 |
| | | | 701/41 |

FOREIGN PATENT DOCUMENTS

| | | |
|---|---|---|
| EP | 2436540 A1 | 4/2012 |
| GB | 2346495 A | 8/2000 |

OTHER PUBLICATIONS

International Search Report for International application No. PCT/EP2013/068465 mailed Jan. 2, 2014.
Combined Search and Examination Report under Sections 17 and 18(3) for Application No. GB1215900.0 dated Jan. 3, 2013.

* cited by examiner

METHOD AND SYSTEM FOR PREVENTING INSTABILITY IN A VEHICLE-TRAILER COMBINATION

TECHNICAL FIELD

The present invention relates to a method and a system for preventing instability in a vehicle-trailer combination and, particularly, but not exclusively to a vehicle-trailer combination comprising a motor vehicle towing a trailer attached to the vehicle at a hitch point.

BACKGROUND

When a vehicle, such as a car, van or truck, tows a trailer there is a tendency for the trailer to oscillate or "fish-tail" behind the vehicle. This can be particularly problematic at high road speeds and during critical manoeuvres such as lane changes and sharp cornering. If left unchecked such oscillations can be dangerous and are a common source of road accidents.

Vehicle-trailer combinations typically act like damped systems in which the magnitude of a damping co-efficient associated with the system dictates the rate at which oscillations of the trailer decay after it has been displaced from a neutral position behind the towing vehicle, e.g. by a gust of wind, etc. With such a system, the greater the vehicle's road speed, the lower the damping co-efficient of the vehicle-trailer system becomes. Thus, the system becomes increasingly unstable as velocity increases. This means that the faster the vehicle travels, the greater the tendency for dangerous and uncontrollable trailer oscillations to occur. This problem is exacerbated by the fact that, in recent years, increasingly stringent vehicle emission regulations have resulted in a decrease in average vehicle weight and studies have shown that this decrease in vehicle weight has had an adverse effect of vehicle stability, particularly when towing a trailer.

Many vehicles are provided with Electronic Stability Control (ESC) (also known as Electronic Stability Programs (ESP) and Dynamic Stability Control (DSC)) which help improve vehicle stability. Such systems typically detect excessive vehicle yaw using gyroscopic sensors or similar arrangements and then counteract this by selectively braking individual wheels of the vehicle. When such a vehicle tows a trailer, ESC can help to improve the stability of the vehicle-trailer system in a similar fashion. However, due to the greatly increased instability and weight of the vehicle-trailer system (relative to the vehicle on its own), a greater magnitude and frequency of braking must be applied to maintain stability, which has a tendency to prematurely wear and overheat the vehicle's brakes. Furthermore, at high road speeds, by the time the oscillations of the trailer reach such a magnitude that they induce sufficient vehicle yaw so as to cause the ESC to apply the vehicle's brakes, it may be too late to take sufficient corrective action with the result that a critical instability in the vehicle-trailer system develops, causing a road accident.

It is an aim of the present invention to substantially overcome or mitigate at least some of the above-mentioned problems.

SUMMARY OF THE INVENTION

According to one aspect of the present invention, there is provided a method of preventing instability in a vehicle-trailer combination, the method comprising;

monitoring relative movement between the vehicle and the trailer using optical sensing means;

determining a trailer yaw condition in dependence on a signal output from the optical sensing means;

comparing the determined trailer yaw condition to a predetermined threshold yaw condition; and when the determined trailer yaw condition is equal to or greater than the predetermined threshold yaw condition, outputting an alert signal indicative of the onset of instability in the vehicle-trailer combination.

The above-described approach advantageously allows for the early detection of instability in the vehicle-trailer combination such that corrective action may be taken before a critical instability has developed. In particular, by employing optical sensing means to monitor relative movement of the trailer, it is possible to detect the onset of instability before the trailer exerts sufficient yaw forces on the vehicle to cause a critical instability.

Advantageously, the method may comprise outputting the alert signal directly to the driver of a vehicle in order to allow the driver to take corrective measures.

Furthermore, the threshold condition at which the alert signal is output may be set such that an alert may be issued before the forces exerted on the towing vehicle by the swaying trailer are sufficient to trigger operation of an Electronic Stability Program of the towing vehicle. In this way, corrective measures may be taken by the driver to reduce trailer sway and undesirable brake wear caused by repeated intervention of the ESP when towing a trailer may be avoided. The alert signal may be provided to a human-machine interface (HMI) of the vehicle to warn the driver of the vehicle or provide the driver with advice on how to reduce trailer sway. The alert signal may result in an audible and/or a visual warning or instruction being provided to the driver.

Alternatively, the alert signal may be output to an electronic stability system of the vehicle in order to allow the electronic stability system to take corrective measures.

The corrective measures taken, either by the driver or automatically under the control of the electronic stability system, may comprise reducing a throttle input so as to slow the vehicle and trailer without the need to apply the vehicle brakes.

Optionally, the step of determining a trailer yaw condition comprises determining one or both of a trailer yaw angle and a trailer yaw frequency.

Advantageously, the method comprises determining the trailer yaw condition in dependence on a signal output from at least one further sensing means.

Optionally, determining the trailer yaw condition comprises performing a Fourier Transform analysis of the respective signals output from said optical sensing means and said at least one further sensing means.

Advantageously, the method comprises determining the trailer yaw condition in dependence on a weighting factor associated with each of the optical sensing means and said at least one further sensing means, the weighting factor being indicative of the expected accuracy with which the trailer yaw condition can be determined using the optical sensing means and the at least one further sensing means, respectively, a higher weighting factor being associated with a greater expected accuracy.

Advantageously, said at least one further sensing means may comprise a contactless sensor, optionally an ultrasonic sensor or a radar sensor.

Alternatively, said at least one further sensing means may comprise an encoder arrangement. Preferably, the encoder arrangement comprises a rotary encoder disposed at a trailer hitch point.

The optical sensing means may comprise a camera.

Conveniently, the method may comprise capturing a reference image of the trailer using the camera, monitoring the trailer during towing using the camera, and determining the trailer yaw condition based on differences between a monitored image of the trailer and the reference image.

Optionally, determining the trailer yaw condition comprises registering the relative dimensions of at least a portion of the trailer, as viewed by the camera in a neutral condition, and comparing those registered relative dimensions to those viewed by the camera during towing of the trailer in order to determine the yaw condition.

In another aspect, the present invention provides a computer program stored in a memory, such that when a processor of a vehicle is programmed by the computer program, the processor is adapted to perform any of the methods set out above.

In a further aspect, the present invention provides a system for preventing instability in a vehicle-trailer combination, the system comprising;
optical sensing means disposed on the vehicle for sensing relative movement between the vehicle and the trailer;
a controller having a processor and a memory;
wherein the memory contains a computer program as set out above, and wherein the processor is programmed to control the system to perform any of the methods as set out above.

According to another aspect of the present invention, there is provided a method of preventing instability in a vehicle-trailer combination, the method comprising;
sensing relative movement between the vehicle and the trailer using first and second sensors;
outputting a signal from each of the first and second sensors;
determining first and second trailer yaw conditions in dependence on respective signals from the first and second sensors;
applying a weighting factor to each of the first and second trailer yaw conditions in dependence on the expected accuracy of the respective first and second sensors, a higher weighting factor being associated with a greater expected accuracy; and
determining a composite trailer yaw condition in dependence on the weighted first and second trailer yaw conditions;
comparing the determined composite trailer yaw condition to a predetermined threshold yaw condition; and
when the determined composite trailer yaw condition is equal to or greater than the predetermined threshold yaw condition, outputting an alert signal indicative of the onset of instability in the vehicle-trailer combination.

The above-described approach advantageously allows for the early detection of instability in the vehicle-trailer combination such that corrective action may be taken before a critical instability has developed. In particular, monitoring relative movement of the trailer using first and second sensors wherein a weighting factor is applied to the trailer yaw conditions associated with each of the signals output from the respective sensors provides the versatility to detect trailer instability in a range of conditions. For example, depending on driving conditions such as fog, dust, darkness, etc. weighting factors may be applied such that a higher weighting is given to the sensor which is best suited to the conditions.

Advantageously, the method may comprise outputting the alert signal directly to the driver of a vehicle in order to allow the driver to take corrective measures.

Alternatively, the alert signal may be output to an electronic stability system of the vehicle in order to allow the electronic stability system to take corrective measures.

Optionally, the step of determining the first and second trailer yaw conditions comprises determining one or both of a trailer yaw angle and a trailer yaw frequency.

Conveniently, determining the first and second trailer yaw conditions comprises performing a Fourier Transform analysis of the respective signals output from the first and second sensors.

Conveniently, the first and second sensors may comprise one of an optical sensor, an ultrasonic sensor, a radar sensor and an encoder arrangement.

The first sensor may comprise a camera.

Conveniently, the method comprises capturing a reference image of the trailer using the camera, monitoring the trailer during towing using the camera, and determining the trailer yaw condition based on differences between a monitored image of the trailer and the reference image.

Conveniently, determining the trailer yaw condition comprises registering the relative dimensions of at least a portion of the trailer, as viewed by the camera in a neutral condition, and comparing those registered relative dimensions to those viewed by the camera during towing of the trailer in order to determine the yaw condition.

In aspects, the present invention provides a computer program stored in a memory, such that when a processor of a vehicle is programmed by the computer program, the processor is adapted to perform the any of the methods as set out above.

In another aspect, the invention provides system for preventing instability in a vehicle-trailer combination, the system comprising;
first and second sensors disposed on the vehicle for sensing relative movement between the vehicle and the trailer;
a controller having a processor and a memory;
wherein the memory contains a computer program as set out above, and wherein the processor is programmed to control the system to perform any of the methods as set out above.

In aspects, the present invention provides a vehicle operating in accordance with any of the methods as set out above or having any of the systems as set out above.

Within the scope of this application it is expressly envisaged that the various aspects, embodiments, examples and alternatives set out in the preceding paragraphs, in the claims and/or in the following description and drawings, and in particular the individual features thereof, may be taken independently or in any combination. Features described in connection with one embodiment are applicable to all embodiments, unless such features are incompatible.

BRIEF DESCRIPTION OF THE DRAWINGS

Embodiments of the present invention will now be described, by way of example only, with reference to the accompanying drawings, in which.

DETAILED DESCRIPTION

Figure 1B:
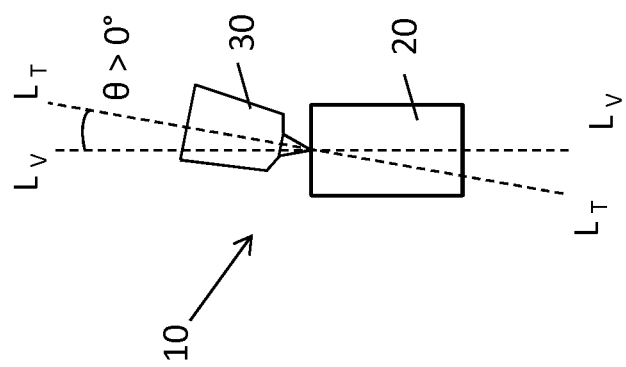
FIG. 1B is a schematic plan view diagram of the vehicle-trailer combination of FIG. 1A in a trailer yaw position.
Figure 1A:
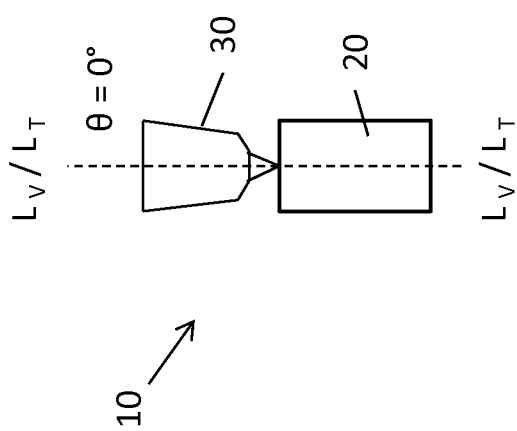
FIG. 1A is a schematic plan view diagram of a vehicle-trailer combination in a neutral position.

Referring to FIG. 1A, a vehicle-trailer combination 10 comprises a vehicle 20 towing an attached trailer 30. In FIG. 1A, the vehicle-trailer combination 10 is in a neutral state where the longitudinal axis $L_V$ of the vehicle 20 is substantially aligned with the longitudinal axis $L_T$ of the trailer 30. In this condition the yaw angle, $\theta$, of the trailer 30 relative to the vehicle 20 is at or near 0°.

Referring to FIG. 1B, as the vehicle 20 tows the trailer 30, there may be a tendency for the trailer 30 to yaw away from the neutral position represented in FIG. 1A thereby resulting in a yaw angle $\theta$ which is greater than 0°. This tendency to yaw may result from many factors, for example, the dynamics of lane-change manoeuvres, wind gusts, sharp cornering, adverse cambers etc. Furthermore, in such damped systems, once the trailer 30 has departed from its neutral position, it will normally tend to return back towards the neutral position; however, once it reaches the neutral position its momentum will also cause it to pass through the neutral position in a pendulum effect which results in a swaying motion of the trailer 30 relative to the vehicle 20. The rate at which the trailer 30 moves between a yawed position on one side of the vehicle 20 to an opposite yaw position on the other side of the vehicle 20 is the yaw frequency.

In the presently described embodiment, movement of the trailer 30 relative to the towing vehicle 20 is sensed by optical sensing means and, more specifically, by an optical sensor such as a rearward facing camera mounted on the vehicle 20. In the case that the vehicle 20 is provided with one or more rearward facing parking assist cameras, these may be employed for the purpose of sensing movement of the trailer, advantageously obviating the need for an additional camera. Additionally, in the present embodiment, the relative movement of the trailer is also detected using ultrasonic sensors, which may conveniently be existing park-assist sensors mounted on the rear of the vehicle 20. Thus, advantageously, the trailer yaw angle $\theta$, i.e. the deviation of the trailer 30 away from the neutral position, is detected by contactless sensors on-board the vehicle. This has the advantage that the sensors are not subjected to any mechanical wear and tear. In further embodiments of the present invention, other types of sensing means may be employed to detect the relative movement between the vehicle 20 and trailer 30 e.g. radar and/or a mechanical arrangement provided at the trailer hitch point such as an encoder wheel arrangement.

Figure 2B:
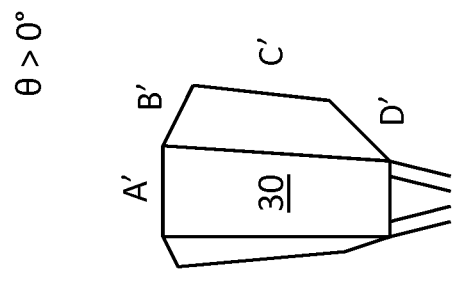
FIG. 2B is a schematic illustration of an image viewed by the rearward facing camera where the trailer is in a yawed position.
Figure 2A:
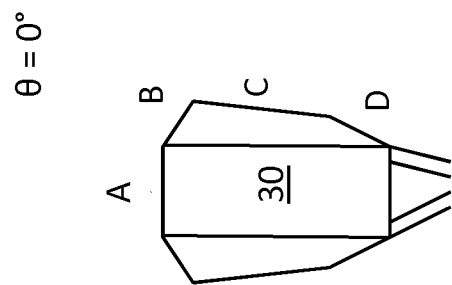
FIG. 2A is a schematic illustration of an image viewed by a rearward facing vehicle-mounted camera where the trailer is in a neutral position.

Referring to FIGS. 2A and 2B, a method of determining the yaw angle of the trailer's longitudinal axis $L_T$ relative to the vehicle's longitudinal axis $L_V$ using a rearward facing camera mounted on the vehicle will now be described.

As shown in FIG. 2A, a registration process may be first undertaken by the driver in order to ascertain the dimensions of the trailer edges as viewed by the camera. Although these relative dimensions may be input manually into the system by the driver if desired, the camera can instead be used to register these dimensions automatically based on the image viewed. In the embodiment shown, the dimensions registered are edges A, B, C and D of the trailer 30; however, it will be appreciated that any other dimensions of trailer 30 could instead be registered as desired.

As shown in FIG. 2B, as the trailer 30 departs from the neutral position in a yawing movement, the dimensions of edges A', B', C', D' of the trailer 30 viewed by the camera will change relative to those that were viewed by the camera when the trailer was in the neutral position. This change in the relative dimensions viewed by the camera can be readily correlated to the change in yaw angle $\theta$ of the trailer relative to the vehicle. This effect is amplified by the proximity of the rearward facing camera to the trailer since even relatively small angular movements will result in significant changes in the relative dimensions of the trailer perceived by the camera. For example, as the yaw angle of the trailer 30 increases, the upper and lower side edges B', D' on the right-hand side of the trailer (as viewed by the camera) appear to be lengthened as compared to how they appear in FIG. 2A. Similarly, the corresponding upper and lower side edges on the left-hand side of the trailer 30, appear shortened in FIG. 2B compared to how they appear in FIG. 2A.

The above method of determining the trailer yaw angle is based upon a comparison of relative perceived dimensions of the trailer 30. Therefore, it may not be necessary to perform the registration when the trailer 30 is in the neutral position but may instead be possible to perform the registration procedure when the trailer 30 is at any initial angle relative to the vehicle 20.

In the present embodiment, more than one camera may be provided, and in addition to the camera(s), the vehicle 20 is also provided with additional sensors, such as ultrasonic sensors, which also detect a value for the yaw angle $\theta$ of the trailer 30. In the case that the ultrasonic sensors are existing park-assist sensors mounted on the vehicle, such sensors are typically deployed at spaced locations across the rear of the vehicle, e.g. at respective positions along a rear bumper of the vehicle. Each ultrasonic sensor may therefore be used to detect changes in the distance to an adjacent portion of the trailer 30 as the trailer oscillates from side to side about the neutral position. In more detail, as the trailer 30 yaws to one side, an ultrasonic sensor disposed on one side of the hitch point detects that an adjacent portion of the trailer is getting closer to the vehicle, whereas an ultrasonic sensor disposed on the opposite side of the hitch point detects the trailer 30 is getting further away. When the trailer 30 yaws in the opposite direction, the reverse is true.

Figure 3:
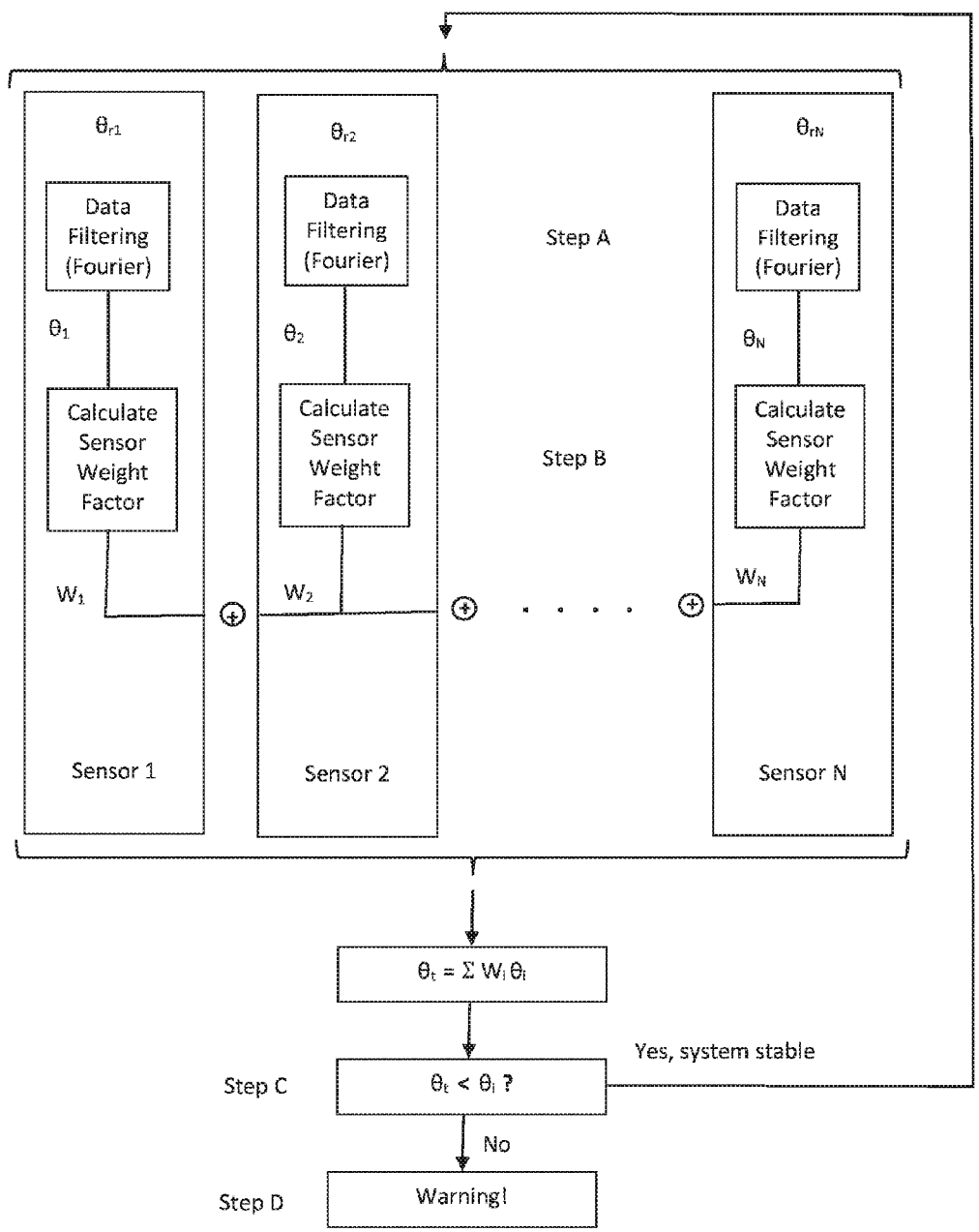
FIG. 3 is a flow diagram illustrating a method of analysing and filtering the data output from an array of sensors in accordance with an embodiment of the present invention.

The respective signals output from the camera and the ultrasonic sensors each provide a means for measuring the yaw angle of the trailer and these measurements of the yaw angle are input to processing means which performs the filtering and analysis method of FIG. 3.

Figure 4:
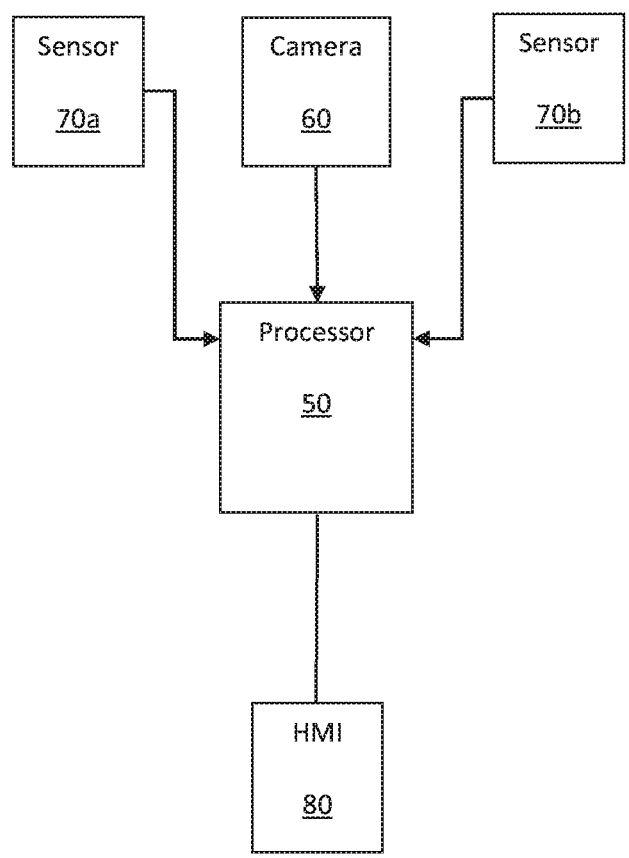
FIG. 4 shows a system for preventing instability in a vehicle-trailer combination according to an embodiment of the present invention.

Referring to FIG. 4, a system for preventing instability in a vehicle-trailer combination comprises processing means in the form of a processor 50, a rearward facing camera 60 mounted on the vehicle, ultrasonic sensors 70a, 70b and a human-machine interface (HMI) 80. The processor 50 may be incorporated in an electronic control unit (ECU) of the vehicle 20 or it may be a separate processor. Each of the camera 60 and the ultrasonic sensors 70a, 70b are connected to the processor 50 such that the signals output from each of the sensors 60, 70a, 70b are received by the processor 50, and the processor 50 is operable to convert the received signals into respective measurements of the yaw angle of the trailer 30. As explained above, the signal from the camera 60 can be used to determine the yaw angle of the trailer 30 by means of the measured change in dimensions of the trailer 30 compared to a reference image. The signals from the ultrasonic sensors 70a, 70b may be combined to provide an estimate of the trailer yaw angle based on the measured changes in the proximity of adjacent portions of the trailer to each sensor 70a, 70b as described previously.

As shown in FIG. 3, the raw yaw reading output from a first sensor, i.e. the camera 60, is provided to the processor 50 as $\theta_{r1}$. The raw yaw reading output from a second sensor (i.e., the ultrasonic sensors 70a, 70b) is provided as $\theta_{r2}$. It should be noted that the method and system of the present invention may utilise/include any number of sensors suitable for measuring relative movement between the vehicle 20 and trailer 30 such that a measurement of the trailer yaw angle can be derived from the signal output therefrom. This is represented by $\theta_{rN}$ in FIG. 3.

Although a number of methods may be used to process the raw yaw outputs from the various sensors, referring to step A in FIG. 3, in the present embodiment this is achieved by performing a Fourier Transform analysis in order to isolate the element of interest in the received signal. In more detail, the yaw angle measured by, for example, the camera 60, will typically comprise a sinusoidal wavetrace which is characteristic of the trailer 30 repeatedly swaying to one side of the neutral position and then the other. However, the signal may also comprise unwanted elements, such as noise. Accordingly, the Fourier Transform analysis of the signal allows the various components which make up the signal to be isolated. This then allows any noise components to be filtered out so as to provide a sinusoidal waveform with the noise elements filtered out. The result is output from Step A as filtered yaw readings $\theta_1$, $\theta_2$, $\theta_N$.

At step B, the resulting filtered yaw readings are input into a weighting step where sensor weight factors $W_1$, $W_2$, ... $W_N$ are calculated. The combined weightings for each sensor all add to 1, i.e. $W_1+W_2 \ldots +W_n=1$. For example, in the presently described system having one yaw angle measurement based on the camera signal and one measurement based on the ultrasonic sensors this would be determined as $W_{camera}+W_{ultrasonic}=1$.

In a variation of the above-described method, the signal/noise ratio of the received sensor signals may be compared in order to identify which signal is to be given the higher weighting, i.e. a signal with a lesser s/n ratio may be given a lower weighting than a less 'noisy' signal.

Furthermore, an example of where one reading may be given a higher weighting than another would be where there is a large discrepancy in the returned signals from the various sensors. This might occur when the input from the camera is obscured by fog, dust or darkness etc. in which case the camera will be given a relatively lower weighting than the ultrasonic sensor.

The yaw angle $\theta_t$ at any given time is then calculated as $$\theta_t = \Sigma W_i \theta_i$$

where $\theta_i$ and $W_i$ are the instantaneous filtered yaw angle measured by a particular sensor and the associated weighting determined for the particular sensor, respectively.

The resulting filtered and weighted yaw angle measured $\theta_t$ is then compared at Step C with a predetermined critical yaw angle $\theta_c$. If $\theta_t$ is less than $\theta_c$ the system is determined as being stable and no warning is given; however, if $\theta_t$ is greater than $\theta_c$ the system has identified the onset of an unstable condition which could lead to an oscillation. In this scenario an appropriate warning is issued to the driver via the HMI 80 at Step D to take corrective action. The warning sent to the driver at Step D could be an audible or visual warning such as a warning light on the instrument dashboard. The decision on what form of corrective action is required may be left to the driver; however, it will normally involve easing off the accelerator or gently applying the brakes. Indeed, different types of warning may be provided depending upon the severity of the situation and these warnings may include suggestions to the driver on the best course of action. For example, a warning sign or symbol could be displayed recommending that the driver applies the brakes or that the driver releases the accelerator, and/or steers the vehicle in a particular direction.

In the above-described example, the yaw condition of the trailer 30 which is determined from the signal output by the various sensors is the yaw angle. However, other parameters may be monitored by the system in a similar way. One particular variable which could also be simultaneously detected by the same sensors is the yaw frequency of the trailer. This can further facilitate early detection of an instability condition. This is because particular frequency modes can mean an increased likelihood of critical instability developing regardless of the magnitude of angular displacement of the trailer 30 relative the vehicle 20. In other words, a small angular sway at the correct frequency can be dangerous even if the magnitude of the sway is not. Accordingly, in a variation of the above-described embodiment, the processor 50 is operable to determine the yaw frequency of the trailer 30 based on each of the signals output from the respective sensors. A weighted yaw frequency may be calculated by applying weightings to the measurements from each of the various sensors in the same way as described previously. The weighted yaw frequency may then be compared to a threshold frequency, which is characteristic of the onset of instability in the vehicle-trailer combination and, in the event that the threshold is exceeded, an alert signal may be output to the HMI 80 to warn the driver to take corrective measures. In a yet further embodiment of the present invention, the processor 50 may be operable to determine both a weighted yaw angle and a weighted yaw frequency from the sensor signals and to compared the determined angle and frequency values to respective thresholds, the alert signal being output in dependence on one or both of the thresholds being exceeded by the determined values.

The previously described system detects the onset of oscillations in the vehicle-trailer system at a very early stage thereby allowing action to be taken by the driver to prevent the oscillation developing further. Furthermore, this can be used to allow the driver to determine an optimum driving speed (one at which the warning does not activate) thereby minimising the need for braking.

In the embodiment of the invention described above, the primary output from the system is a warning given directly to the driver in order to allow the driver to take the required corrective action; however, in an alternative embodiment of the invention, the alert signal output from the system may be input into the vehicle's existing ESC system. This allows the ESC to automatically take corrective action on behalf of the driver. This approach has an advantage over existing systems in that over-braking of the vehicle wheels may be avoided. This is because a system operating in accordance with this embodiment of the invention directly monitors the movement of the trailer such that the alert signal is output to the ESC at a much earlier stage and therefore corrective action may be taken earlier to prevent instability from occurring. For example, this could mean that upon detecting the early onset of oscillation, the ESC system automatically eases off the accelerator without having to apply the vehicle's brakes in order to regulate the vehicle-trailer road speed.

In contrast, with a system in which the ESC is responsive to the output of gyroscopic yaw sensors disposed on the vehicle, it may be the case that, by the time the yaw sensors detect significant yaw of the vehicle for the ESC to instigate corrective measures, the oscillations of the trailer are such that it is too late to stop a critical instability from developing.

The invention claimed is:

1. A method of preventing instability in a vehicle-trailer combination, the method comprising:
   monitoring relative movement between the vehicle and the trailer using optical sensing means, wherein the optical sensing means comprises a camera;
   determining a trailer yaw condition in dependence on a signal output from the optical sensing means;
   comparing the determined trailer yaw condition to a predetermined threshold yaw condition;
   when the determined trailer yaw condition is equal to or greater than the predetermined threshold yaw condition, outputting an alert signal indicative of the onset of instability in the vehicle-trailer combination directly to a driver of the vehicle in order to allow the driver to take corrective measures;
   capturing a reference image of the trailer using the camera;
   monitoring the trailer during towing using the camera; and
   determining the trailer yaw condition based on at least one difference between a monitored image of the trailer and the reference image.

2. A method according to claim 1, wherein the step of determining a trailer yaw condition comprises determining one or both of a trailer yaw angle and a trailer yaw frequency.

3. A method according to claim 1, comprising determining the trailer yaw condition in dependence on a signal output from at least one further sensing means.

4. A method according to claim 3, wherein determining the trailer yaw condition comprises performing a Fourier Transform analysis of the respective signals output from said optical sensing means and said at least one further sensing means.

5. A method according to claim 3, comprising determining the trailer yaw condition in dependence on a weighting factor associated with each of the optical sensing means and said at least one further sensing means, the weighting factor being indicative of the expected accuracy with which the trailer yaw condition can be determined using the optical sensing means and the at least one further sensing means, respectively, a higher weighting factor being associated with a greater expected accuracy.

6. A method according to claim 3, wherein said at least one further sensing means is at least one of a contactless sensor, an ultrasonic sensor, a radar sensor, an encoder arrangement, or a rotary encoder disposed at a trailer hitch point.

7. A method according to claim 1, wherein determining the trailer yaw condition comprises registering the relative dimensions of at least a portion of the trailer, as viewed by the camera in a neutral condition, and comparing those registered relative dimensions to relative dimensions viewed by the camera during towing of the trailer in order to determine the yaw condition.

8. A computer program stored in a memory, such that when a processor of a vehicle is programmed by the computer program, the processor is adapted to perform the method of claim 1.

9. A system for preventing instability in a vehicle-trailer combination, the system comprising;
   optical sensing means disposed on the vehicle for sensing relative movement between the vehicle and the trailer;
   a controller having a processor and a memory;
   wherein the memory contains a computer program used by the processor to control the system to perform the method of claim 1.

10. A vehicle having the system of claim 9.

11. A method of preventing instability in a vehicle-trailer combination, the method comprising;
   sensing relative movement between the vehicle and the trailer using first and second sensors;
   outputting a signal from each of the first and second sensors;
   determining first and second trailer yaw conditions in dependence on respective signals from the first and second sensors;
   applying a weighting factor to each of the first and second trailer yaw conditions in dependence on the expected accuracy of the respective first and second sensors, a higher weighting factor being associated with a greater expected accuracy; and
   determining a composite trailer yaw condition in dependence on the weighted first and second trailer yaw conditions;
   comparing the determined composite trailer yaw condition to a predetermined threshold yaw condition; and
   when the determined composite trailer yaw condition is equal to or greater than the predetermined threshold yaw condition, outputting an alert signal indicative of the onset of instability in the vehicle-trailer combination.

12. A method according to claim 11, comprising outputting the alert signal directly to the driver of a vehicle in order to allow the driver to take corrective measures.

13. A method according to claim 11, comprising outputting the alert signal to an electronic stability system of the vehicle in order to allow the electronic stability system to take corrective measures.

14. A method according to claim 11, wherein the step of determining the first and second trailer yaw conditions comprises determining one or both of a trailer yaw angle and a trailer yaw frequency.

15. A method according to claim 11, wherein determining the first and second trailer yaw conditions comprises performing a Fourier Transform analysis of the respective signals output from the first and second sensors.

16. A method according to claim 11, wherein the first and second sensors are one of an optical sensor, a camera, an ultrasonic sensor, a radar sensor and an encoder arrangement.

17. A computer program stored in a memory, such that when a processor of a vehicle is programmed by the computer program, the processor is adapted to perform the method of claim 11.

18. A system for preventing instability in a vehicle-trailer combination, the system comprising;

first and second sensors disposed on the vehicle for sensing relative movement between the vehicle and the trailer;

a controller having a processor and a memory;

wherein the memory contains a computer program used by the processor to control the system to perform the method of claim 11.

19. A vehicle comprising the system of claim 18.

* * * * *